(No Model.)
O. P. HIX.
TRACK FOR SLIDING DOORS.
No. 448,235. Patented Mar. 17, 1891.
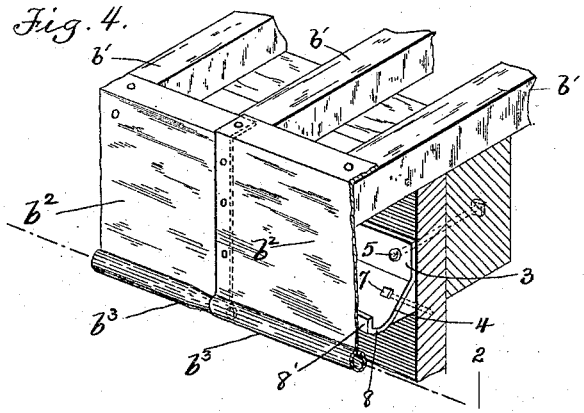
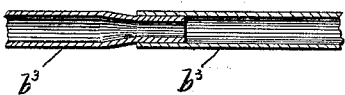
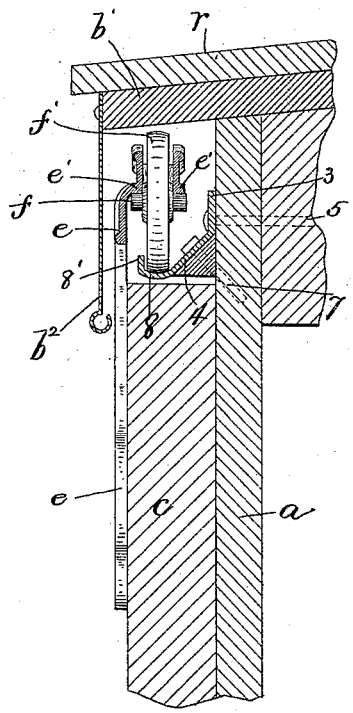
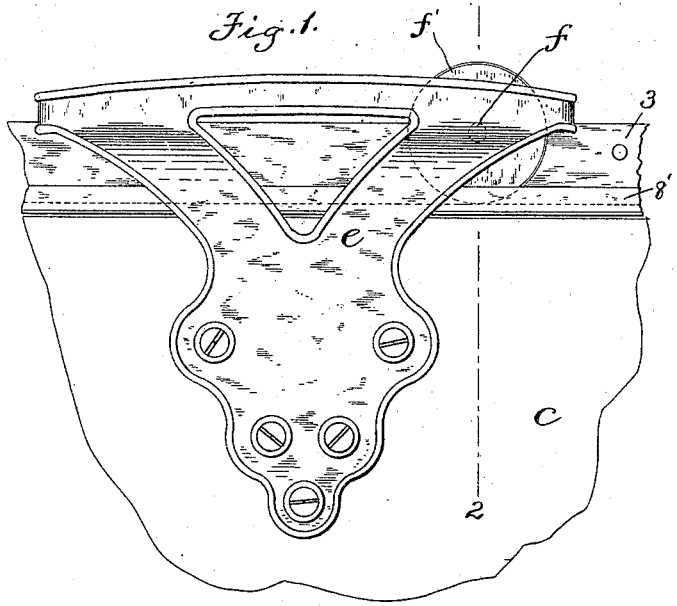
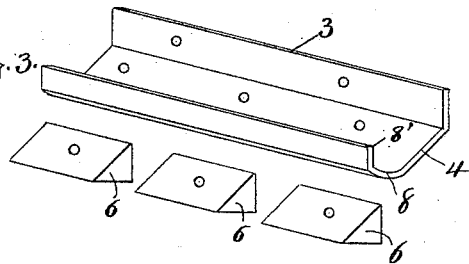
Witnesses
A. D. Harrison
C. G. Bartlett
Inventor
Oliver P. Hix.
Per Wight, Brown & Crossley
Attorneys.
THE NORRIS PETERS CO., PHOTO-LITHO., WASHINGTON, D. C.

UNITED STATES PATENT OFFICE.

OLIVER P. HIX, OF ROCKLAND, MAINE, ASSIGNOR TO THE DUNHAM MANUFACTURING COMPANY, OF BOSTON, MASSACHUSETTS.

TRACK FOR SLIDING DOORS.

SPECIFICATION forming part of Letters Patent No. 448,235, dated March 17, 1891.

Application filed May 23, 1890. Serial No. 352,818. (No model.)

*To all whom it may concern:*

Be it known that I, OLIVER P. HIX, of Rockland, in the county of Knox and State of Maine, have invented certain new and useful Improvements in Tracks for Wheels of Sliding Doors, of which the following is a specification.

This invention has for its object to provide a simple, strong, and durable track for the trolleys or wheels of sliding doors, and particularly for the sliding doors of freight-cars; and it consists in the improved construction which I will now proceed to describe and claim.

In the accompanying drawings, forming a part of this specification, Figure 1 represents a side elevation of a portion of a sliding door for freight-cars and a portion of the track which supports the trolley-wheels of said door. Fig. 2 represents a section on line 2 2 of Fig. 1. Fig. 3 represents a perspective view of a portion of the track and the braces or supports therefor detached from the car. Fig. 4 represents a perspective view of a portion of the car and of the shield or housing for the track and wheels. Fig. 5 represents a section on line 5 5, Fig. 4.

The same letters of reference indicate the same parts in all the figures.

In the drawings, $a$ represents a portion of one side of a freight-car, and $b$ a portion of the roof thereof.

$c$ represents a portion of the door, the same being provided with suitable hangers $e$, provided with rider-bars $e'$, formed to run upon the axles $f$ of the wheels or trolleys $f'$. The hangers and the wheels may be of any suitable construction. The hanger here shown is of the general construction shown in patent to C. H. Dunham, dated February 28, 1888, No. 378,579, the said hanger having two parallel rider-bars, which bear upon the axle $f$ at opposite sides of the wheel $f'$. The wheel $f'$ is, however, of a different construction from that shown in the said Dunham patent, in order to adapt it to the peculiarly-formed track which constitutes the subject of my present invention.

In carrying out my invention I construct the track $g$ of a strip of sheet-steel, which is bent to form at one edge the substantially vertical flange 3, which bears upon the side of the car $a$ above the doorway and is attached to the side of the car by bolts 5, the inclined portion 4, which extends diagonally downward and outward from the portion 3, and the trough-shaped portion 8, which constitutes the outer portion of the plate, said trough-shaped portion terminating in a raised lip 8', which acts as a guard to prevent the wheels $f'$ from moving sidewise off from the track, the periphery of the wheel resting in the depression between the lip 8' and the inclined portion 4.

6 6 represent triangular blocks of metal, which are placed under the inclined portion 4 of the track and bear against the side of the car, as shown in Fig. 2, said blocks closely fitting the triangular space between the side of the car and the inclined portion 4 of the track. Bolts 7, passing through the inclined portion of the track and the triangular blocks 6 into the side of the car, secure said blocks in place and secure the track firmly to the blocks.

It will be seen that the track-plates, secured, as described, to the sides of the car and supported by the blocks 6, constitute a firm and rigid support for the wheels $f'$, said support being entirely within the space occupied by the thickness of the door, so that there is no projection of the track or of its supporting devices outside of the plane of the outer surface of the door. The inclined portion 4 offsets the trough portion 8 from the plane of the flange 3, so that the attachment of said flange to the side of the car determines the position of the trough with relation to the side of the flange.

In Figs. 2 and 4 I have shown as a housing or shield for the track and wheels a series of vertical sheet-metal pieces $b^2$, attached to the ends of the rafters $b'$ and extending downwardly below the edge of the door to exclude rain and snow from the track $g$. Said rafters and the roof $r$ supported thereby are extended outwardly over the tracks, as shown in Figs. 2 and 4. The pieces or sheets $b^2$ preferably overlap each other at their ends and are provided at their lower edges with beads $b^3$, which are formed, as shown in Figs. 4 and 5, to telescope at their meeting ends, the end of one bead entering the corresponding end of the other bead. Said beads give the sheet-metal shield a suitable degree of stiffness at its lower edge and prevents said shield from being bent and indented. By making the shield in sections or short pieces I avoid the necessity of rolling out special sheets of the length that would be required for a shield extending the entire length of the track.

The extended roof of the car forms one part of the housing, while the shield composed of the plates $b^2$ constitutes the other part.

I claim—

1. The improved track-plate formed in one piece and comprising a wheel-tread-supporting trough 8, a lip or guard 8' at one side of the trough, said lip constituting one edge of the plate, a flange or seat 3, formed to bear on the side of a car and constituting the opposite edge of the plate, and an intermediate inclined portion 4, connecting the said flange and trough, whereby the trough and guard are offset from the flange or seat 3, as set forth.

2. The combination of the track composed of the sheet-metal plate having the vertical flange 3, the inclined portion 4, and the trough-shaped portion 8, all formed in one piece, a car to which said flange is attached, and the blocks 6, formed to bear on the under side of the car, as set forth.

3. The combination of a freight-car having its roof extended outwardly over the sides of the car, a track attached to the side of the car over the doorway under the extended roof, and the vertical shield at the outer side of the track, composed of overlapping sections of sheet metal attached at their upper edges to the extended roof and having telescopic beads at their lower edges, one section having its bead reduced at one end to enter the corresponding end of the bead on the overlapping section, as set forth.

In testimony whereof I have signed my name to this specification, in the presence of two subscribing witnesses, this 17th day of May, A. D. 1890.

OLIVER P. HIX.

Witnesses:
C. F. BROWN,
A. D. HARRISON.